US012673411B2

(12) United States Patent
Kim et al.

(10) Patent No.: US 12,673,411 B2
(45) Date of Patent: Jul. 7, 2026

(54) APPARATUS FOR ASSISTING MUSCULAR STRENGTH

(71) Applicants:Hyundai Motor Company, Seoul (KR); Kia Corporation, Seoul (KR)

(72) Inventors: Ho Jun Kim, Gunpo-si (KR); Sang In Park, Suwon-si (KR); Ki Hyeon Bae, Hwaseong-si (KR); Ju Young Yoon, Suwon-si (KR); Beom Su Kim, Yongin-si (KR); Min Woong Jeung, Seoul (KR); Hyo Joong Kim, Suwon-si (KR); Seong Taek Hwang, Suwon-si (KR); Hyun Seop Lim, Anyang-si (KR); Kyu Jung Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 896 days.

(21) Appl. No.: 18/055,022

(22) Filed: Nov. 14, 2022

(65) Prior Publication Data

US 2023/0373079 A1 Nov. 23, 2023

(30) Foreign Application Priority Data

May 19, 2022 (KR) ......................... 10-2022-0061580

(51) Int. Cl.
*B25J 9/10* (2006.01)
*B25J 9/00* (2006.01)
(52) U.S. Cl.
CPC ............. *B25J 9/0006* (2013.01); *B25J 9/109* (2013.01); *A61H 2201/1614* (2013.01); *A61H 2201/1635* (2013.01)

(58) Field of Classification Search
CPC . B25J 9/0006; B25J 9/109; B25J 9/104; B25J 9/102; B25J 19/0016; A61H 2201/1635; A61H 2201/1614; A61H 2201/165–1652; A61H 2201/1445; A61H 1/0274–0281
See application file for complete search history.

(56) References Cited

U.S. PATENT DOCUMENTS

| | | | | |
|---|---|---|---|---|
| 4,180,870 A | * | 1/1980 | Radulovic | ............... A61F 5/013 601/33 |
| 9,737,374 B2 | * | 8/2017 | Doyle | .................... B25J 9/0006 |
| 10,596,059 B2 | | 3/2020 | Angold et al. | |

(Continued)

FOREIGN PATENT DOCUMENTS

| | | | | |
|---|---|---|---|---|
| CN | 108500957 A | * | 9/2018 | ............. A61B 5/389 |
| JP | 5902065 B2 | | 4/2016 | |

(Continued)

OTHER PUBLICATIONS

CN-108500957-A description (Year: 2018).*

(Continued)

*Primary Examiner* — Bradley H Philips
*Assistant Examiner* — Kira B Daher
(74) *Attorney, Agent, or Firm* — Slater Matsil, LLP

(57) ABSTRACT

An embodiment apparatus includes a wire unit surrounding a shoulder of a wearer, a clutch unit penetrated by the wire unit and disposed on a route along which the wire unit extends, and a support unit having a first side rotatably connected to the clutch unit and a second side supporting an elbow of the wearer.

20 Claims, 11 Drawing Sheets

(56)  References Cited

U.S. PATENT DOCUMENTS

| | | | | |
|---|---|---|---|---|
| 2011/0021962 A1* | 1/2011 | Sorrenti | .............. | A63B 21/025 |
| | | | | 602/20 |
| 2012/0184880 A1 | 7/2012 | Doyle | | |
| 2019/0175975 A1* | 6/2019 | Carriere | ............. | A63B 21/4043 |
| 2019/0358074 A1* | 11/2019 | Zelik | ....................... | A61F 5/026 |
| 2022/0071831 A1* | 3/2022 | Kaesmann | ........... | A61H 1/0281 |

FOREIGN PATENT DOCUMENTS

| | | | | | | |
|---|---|---|---|---|---|---|
| KR | 20120086996 | A | | 8/2012 | | |
| KR | 20190001203 | A | * | 1/2019 | ............. | B25J 19/06 |
| KR | 102048931 | B1 | | 1/2020 | | |
| KR | 102154248 | B1 | * | 9/2020 | ........... | B25J 9/0009 |
| WO | WO-2021240018 | A1 | * | 12/2021 | ........... | B25J 9/0006 |

OTHER PUBLICATIONS

KR-102154248-B1 description (Year: 2020).*
KR-20190001203-A description (Year: 2019).*
WO-2021240018-A1 description (Year: 2021).*

* cited by examiner

APPARATUS FOR ASSISTING MUSCULAR STRENGTH

CROSS-REFERENCE TO RELATED APPLICATIONS

This application claims the benefit of Korean Patent Application No. 10-2022-0061580, filed on May 19, 2022, which application is hereby incorporated herein by reference.

TECHNICAL FIELD

The present disclosure relates to an apparatus for assisting muscular strength.

BACKGROUND

A manual upper-limb-wearing robot provides assistive power in accordance with a user's posture when the user works in a state in which the user wears the manual upper-limb-wearing robot on his/her upper body. The manual upper-limb-wearing robot often has a structure that assists the user by providing a force for pressing the user's arm upward when the user's arm is directed upward. The manual upper-limb-wearing robot serves to assist the user when the user works while raising his/her arm, for example, when the user is positioned below a vehicle and performs an assembly process.

However, in an actual workplace, the user often works in various postures in addition to the posture in which the user raises his/her arm. For example, the user often lowers his/her arm down and then lifts an item during a process of carrying the item. However, there is a problem in that the manual upper-limb-wearing robot in the related art cannot properly assist the user.

SUMMARY

The present disclosure relates to an apparatus for assisting muscular strength. Particular embodiments relate to an apparatus for assisting muscular strength that is capable of assisting a user's arms and shoulders when the user works.

Embodiments of the present disclosure can provide assistive power to a wearer in various postures by providing a manual upper-limb-wearing robot having a structure capable of providing assistive power to the wearer when the wearer carries an item.

An embodiment of the present invention provides an apparatus for assisting muscular strength, the apparatus including a wire unit configured to surround a wearer's shoulder, a clutch unit penetrated by the wire unit and disposed on a route along which the wire unit extends, and a support unit having one side rotatably connected to the clutch unit and the other side configured to support the wearer's elbow, in which when the support unit rotates in a first rotation range relative to the clutch unit, the clutch unit restricts a movement of the wire unit in one of two directions in which the wire unit penetrates the clutch unit in a region (hereinafter, referred to as a 'penetration region') in which the wire unit penetrates the clutch unit, and in which when the support unit rotates within a second rotation range relative to the clutch unit, the clutch unit allows the movements of the wire unit in the two directions in which the wire unit penetrates the clutch unit in the penetration region.

The clutch unit may face the wearer's rear part, and the wire unit may pass through the clutch unit, surround the wearer's shoulder, and extend to the wearer's arm via the wearer's front part, and when the support unit rotates within the first rotation range relative to the clutch unit, the clutch unit may restrict an upward movement of the wire unit and allow a downward movement of the wire unit in the penetration region.

The clutch unit may include a ratchet member disposed in the penetration region and having a first serrated section having a serrated shape and formed in a region facing the wire unit, and a pawl member configured to face the ratchet member with the wire unit interposed therebetween, the pawl member being configured to be rotatable and having a second serrated section having a serrated shape and formed in a region facing the wire unit, and when the pawl member rotates by a predetermined angle toward the ratchet member, the ratchet member and the pawl member may press the wire unit.

The ratchet member and the pawl member may be spaced apart from each other in a horizontal direction, and a distance A1 between a rotation center of the pawl member and an upper end of the second serrated section may be shorter than a distance A2 between the rotation center of the pawl member and a lower end of the second serrated section.

The ratchet member and the pawl member may be spaced apart from each other in a horizontal direction, and a distance between a rotation center of the pawl member and the second serrated section may increase in a direction toward a lower portion of the second serrated section.

The first serrated section may be formed in parallel with a direction in which the wire unit extends in the penetration region, and the second serrated section may protrude convexly toward the wire unit in the penetration region.

The clutch unit may further include a support unit rotation shaft configured to couple the support unit to the clutch unit so that the support unit is rotatable, and a lever member coupled to the pawl member and protruding toward the support unit rotation shaft. The support unit rotation shaft may be fixed relative to the support unit, and the support unit rotation shaft may include an interference protruding region protruding toward the lever member and configured to interfere with the lever member in accordance with a rotational motion of the support unit rotation shaft.

When the support unit rotation shaft rotates in a first rotation direction R1, the interference protruding region may press the lever member and rotate the pawl member so that the pawl member moves away from the ratchet member, and when the support unit rotation shaft rotates in a second rotation direction R2 opposite to the first rotation direction R1, the interference protruding region may press the lever member and rotate the pawl member so that the pawl member moves toward the ratchet member.

The first rotation direction R1 may be a direction in which the support unit rotates upward relative to the clutch unit, and the second rotation direction R2 may be a direction in which the support unit rotates downward relative to the clutch unit.

The clutch unit may further include a clutch body coupled to the ratchet member and the pawl member and penetrated by the support unit rotation shaft, a link member coupled to be rotatable about the support unit rotation shaft and fixedly coupled to the support unit, a support spring having one side connected to the clutch body, and a support module having one side rotatably coupled to the clutch body and the other side coupled to the link member, and the other side of the support spring may be connected to or spaced apart from the support module.

A hook region may be formed at the other side of the support spring, an extension region extending in one direction may be formed at one side of the support module, and the hook region may engage with the extension region by a hook engagement.

The support module may include a module rotation shaft rotatably coupled to the clutch body and a rod member configured to penetrate the module rotation shaft, fixedly coupled to the extension region, and having one side coupled to the link member, and a region of the rod member coupled to the link member and a region of the rod member coupled to the extension region may face each other with the module rotation shaft interposed therebetween.

The link member may have a plurality of holes, and one side of the rod member may be selectively coupled to one of the plurality of holes.

The plurality of holes may be disposed to be spaced apart from one another in a direction away from the support unit rotation shaft.

The support spring may be stretched when the support unit rotates downward in the state in which the hook region engages with the extension region by the hook engagement.

The clutch unit may further include a pressing spring disposed at one side of the pawl member and configured to press the pawl member in a direction toward the ratchet member when the pawl member rotates in a direction away from the ratchet member.

The support unit rotation shaft may be disposed above the pawl member, and the pressing spring may be disposed below the pawl member.

The apparatus may further include an elastic member connected to one side of the wire unit and facing the wearer's rear part, and a pulley member disposed below the clutch unit and configured such that the wire unit surrounds an outer portion of the pulley member, in which the wire unit extends from the elastic member, is bent at the pulley member, and then passes through the clutch unit.

The apparatus may further include a shoulder mounting member configured to be in close contact with an upper portion of the wearer's shoulder, in which the wire unit extends from the wearer's rear part, penetrates the shoulder mounting member, and then extends to the wearer's front part.

The apparatus may further include a harness member configured to be worn on the wearer's hand or wrist, in which one end of the wire unit is connected to the harness member.

According to embodiments of the present disclosure, it is possible to provide assistive power to the wearer in various postures by providing the manual upper-limb-wearing robot having the structure capable of providing assistive power to the wearer when the wearer carries an item.

DETAILED DESCRIPTION OF ILLUSTRATIVE EMBODIMENTS

An apparatus 10 for assisting muscular strength according to embodiments of the present disclosure may be configured to provide assistive power to a wearer's arm and shoulder while the wearer works. In particular, as described below, according to embodiments of the present disclosure, the apparatus 10 for assisting muscular strength may provide both a structure for providing assistive power to the wearer's upper arm and a structure for providing assistive power to the wearer's lower arm. More specifically, according to embodiments of the present disclosure, when the wearer works while raising his/her arm (e.g., when the wearer is positioned below a vehicle and performs a vehicle assembly process or installs an electric wire), the apparatus 10 for assisting muscular strength may provide assistive power to the wearer's upper arm to reduce an effort required to maintain the state in which the wearer raises his/her arm. When the wearer works in a state in which the wearer lowers his/her arm, e.g., when the wearer transfers an item, the apparatus 10 for assisting muscular strength may provide assistive power to the wearer's lower arm to reduce an effort required for the wearer to transfer the item.

Meanwhile, an external appearance of the apparatus 10 for assisting muscular strength is not uniform when the wearer does not wear the apparatus 10 for assisting muscular strength. For this reason, it is significantly difficult to describe the structure of the apparatus 10 for assisting muscular strength in the state in which the wearer does not wear the apparatus 10 for assisting muscular strength. Therefore, in the present specification, the apparatus 10 for assisting muscular strength will be described on the basis of the state in which the wearer wears the apparatus 10 for assisting muscular strength. Therefore, the wearer wearing the apparatus 10 for assisting muscular strength is of course not a constituent element of the apparatus 10 for assisting muscular strength according to embodiments of the present disclosure.

Hereinafter, the apparatus 10 for assisting muscular strength according to embodiments of the present disclosure will be described with reference to the drawings.

Figure 1:
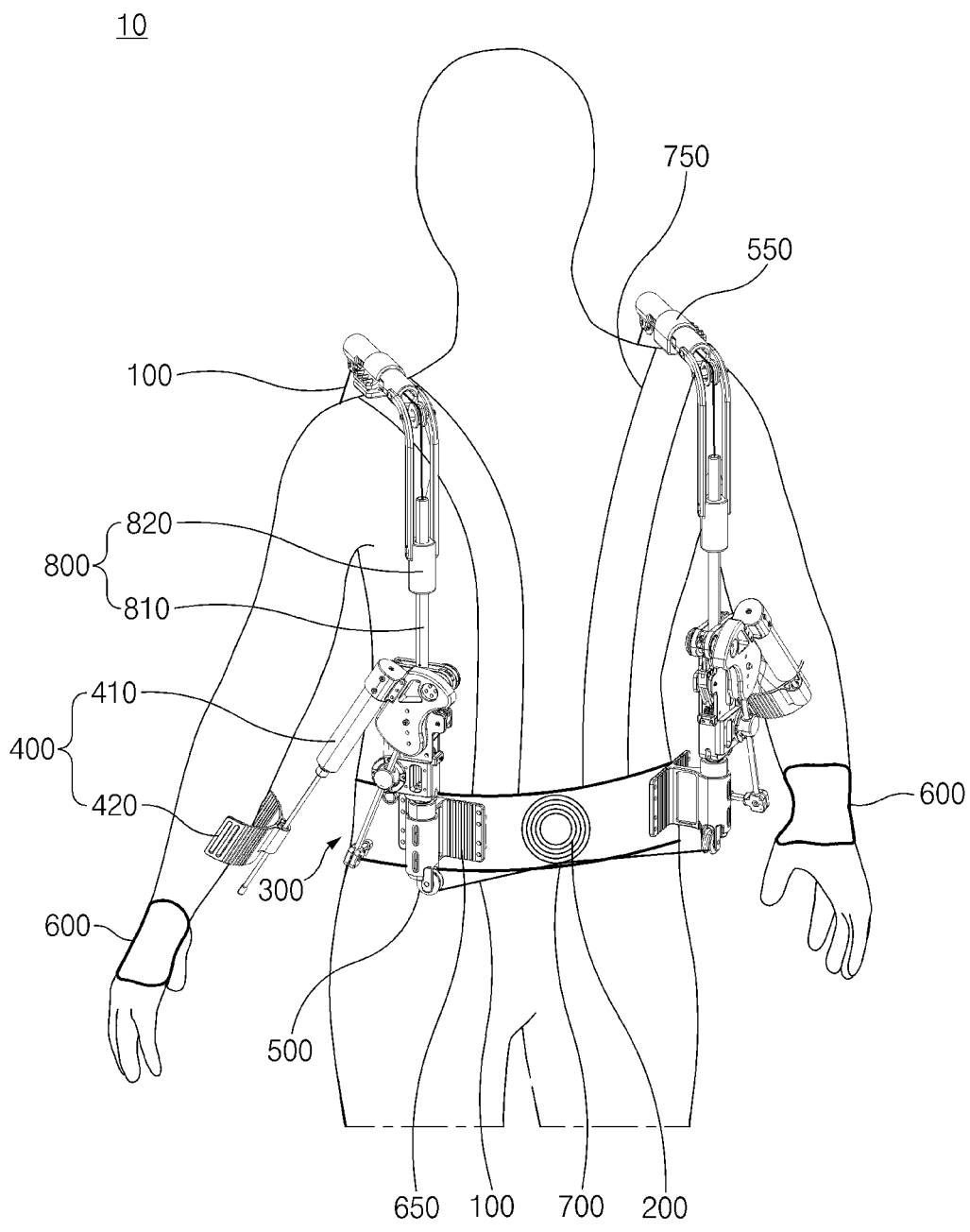
FIG. 1 is a view illustrating a state in which a wearer wears an apparatus for assisting muscular strength according to embodiments of the present disclosure when viewed from the rear side.
Figure 2:
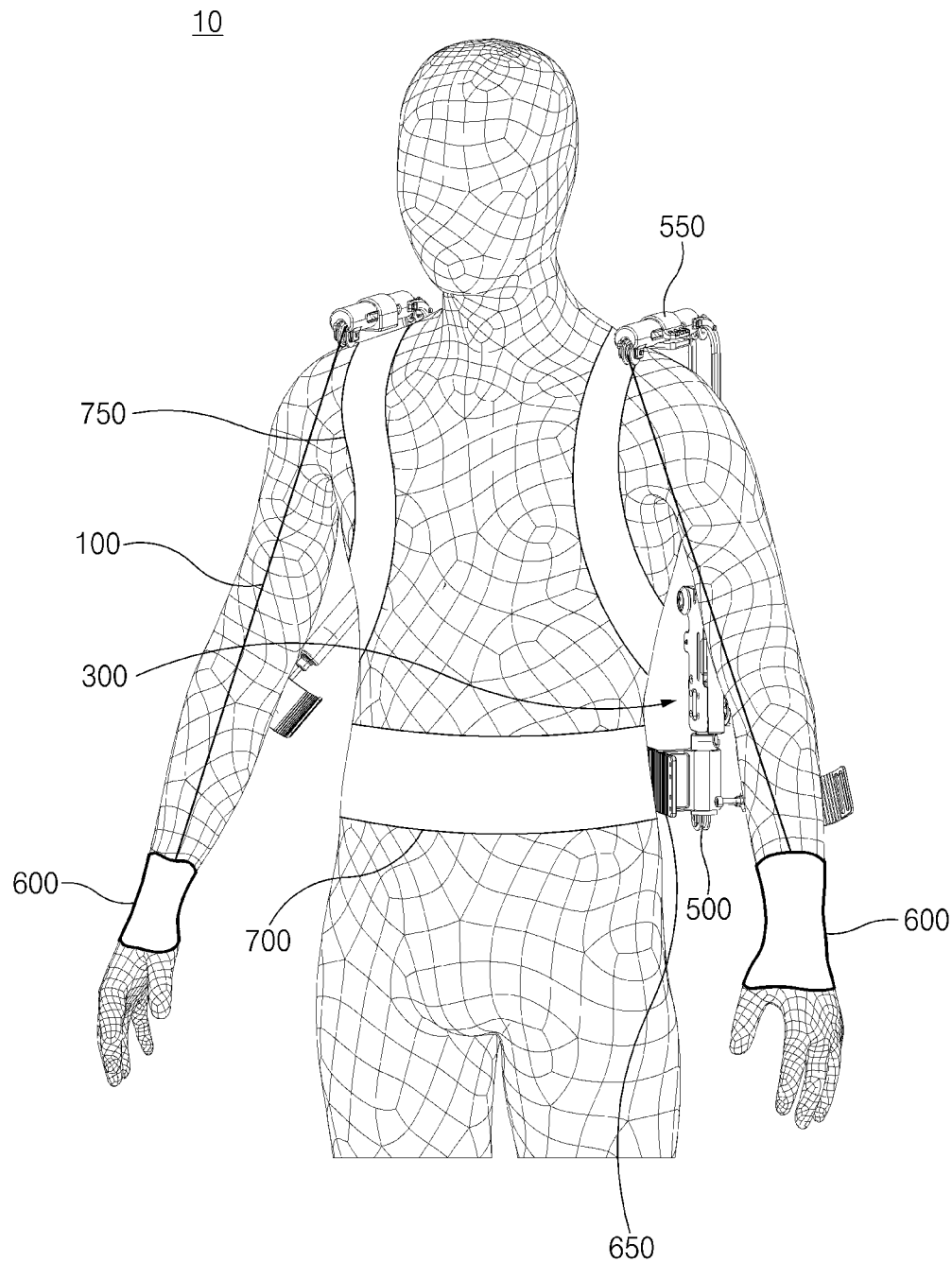
FIG. 2 is a view illustrating a state in which the wearer wears the apparatus for assisting muscular strength according to embodiments of the present disclosure when viewed from the front side.
Figure 3:
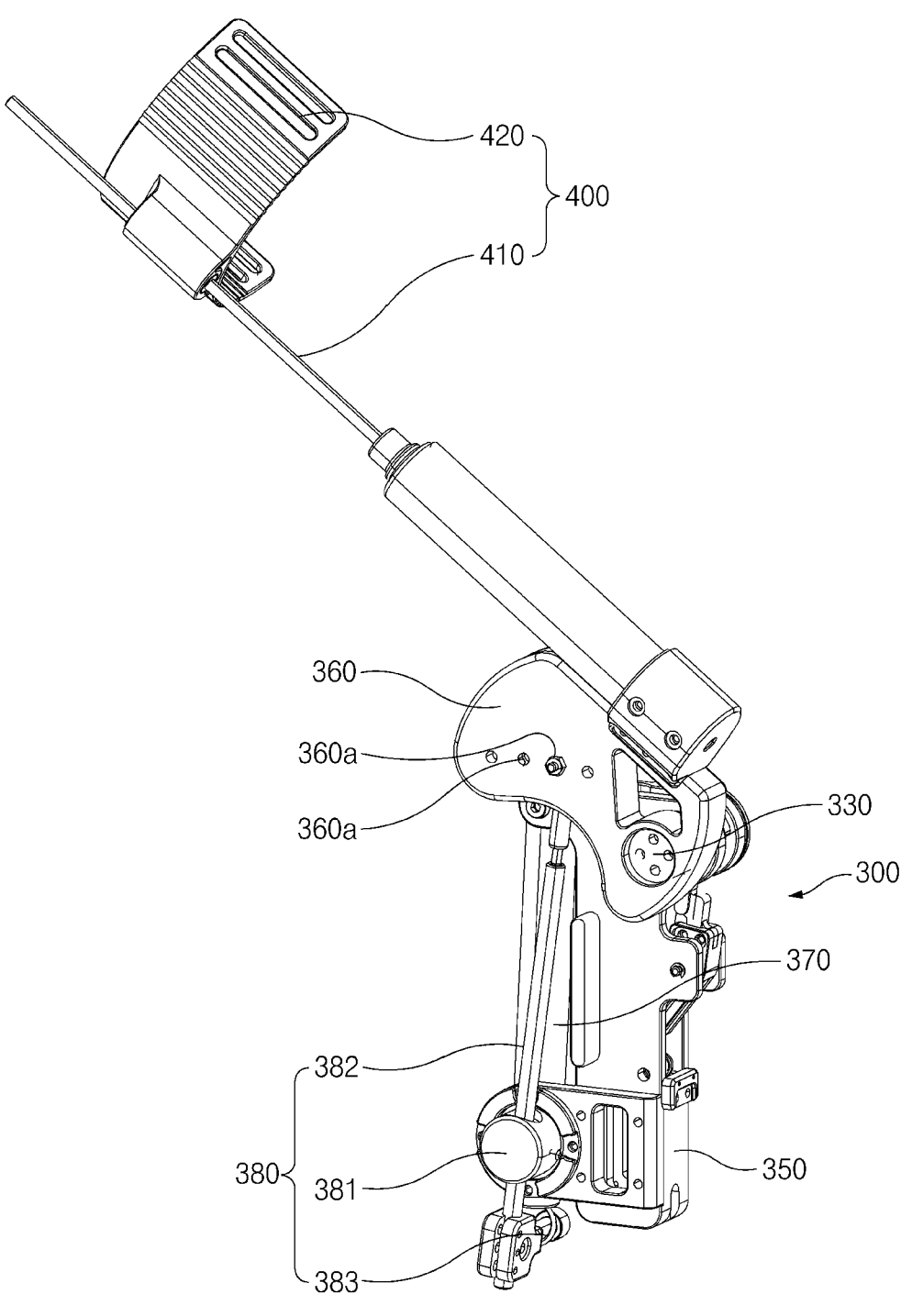
FIG. 3 is a perspective view illustrating a clutch unit and a support unit of the apparatus for assisting muscular strength according to embodiments of the present disclosure.
Figure 4:
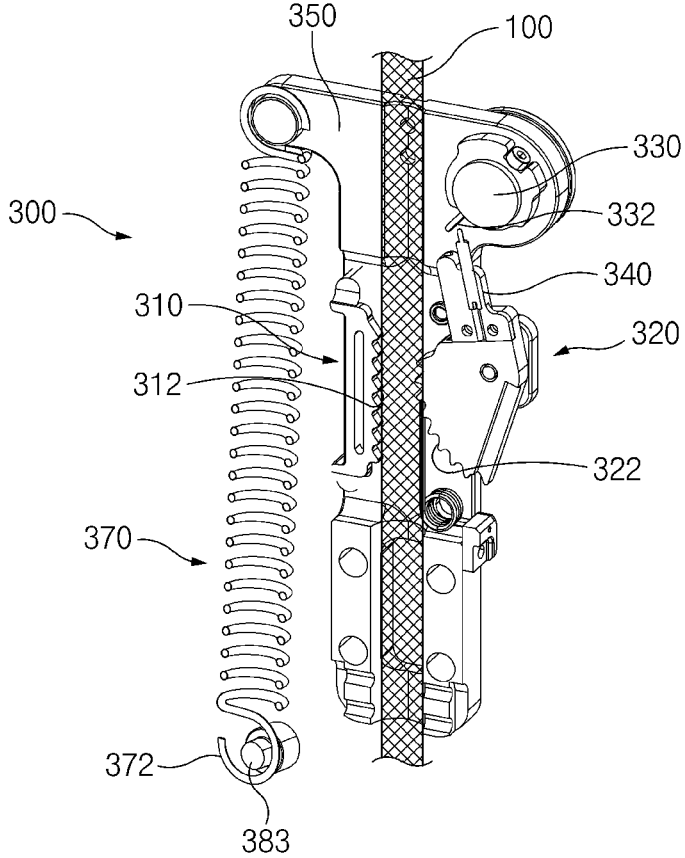
FIG. 4 is a view illustrating the clutch unit of the apparatus for assisting muscular strength according to embodiments of the present disclosure.

FIG. 1 is a view illustrating a state in which the wearer wears the apparatus for assisting muscular strength according to embodiments of the present disclosure when viewed from the rear side, and FIG. 2 is a view illustrating a state in which the wearer wears the apparatus for assisting muscular strength according to embodiments of the present disclosure when viewed from the front side. FIG. 3 is a perspective view illustrating a clutch unit and a support unit of the apparatus for assisting muscular strength according to embodiments of the present disclosure, and FIG. 4 is a view illustrating the clutch unit of the apparatus for assisting muscular strength according to embodiments of the present disclosure.

Figure 5:
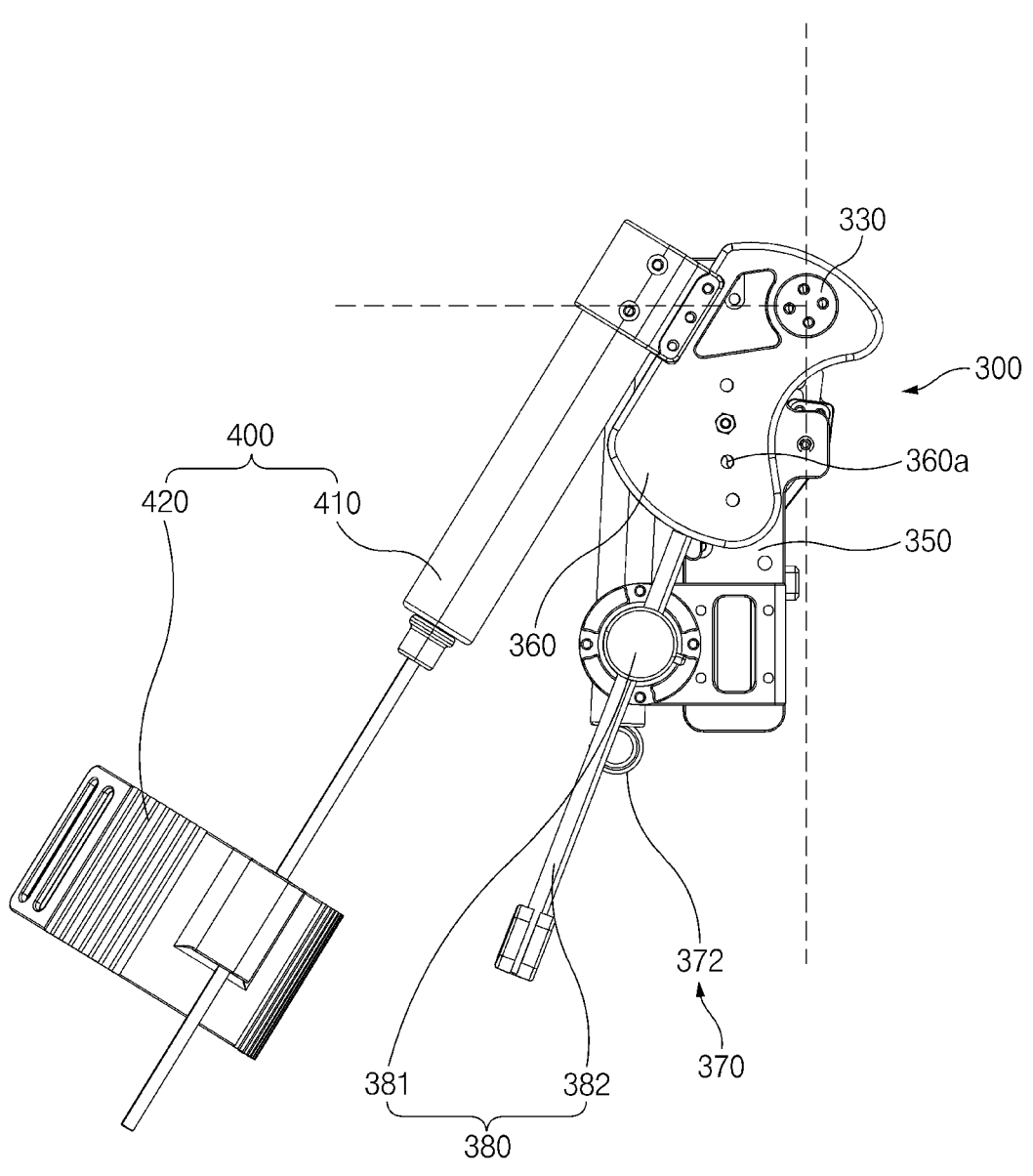
FIG. 5 is a side view illustrating a state in which the support unit of the apparatus for assisting muscular strength according to embodiments of the present disclosure is rotated downward.
Figure 6:
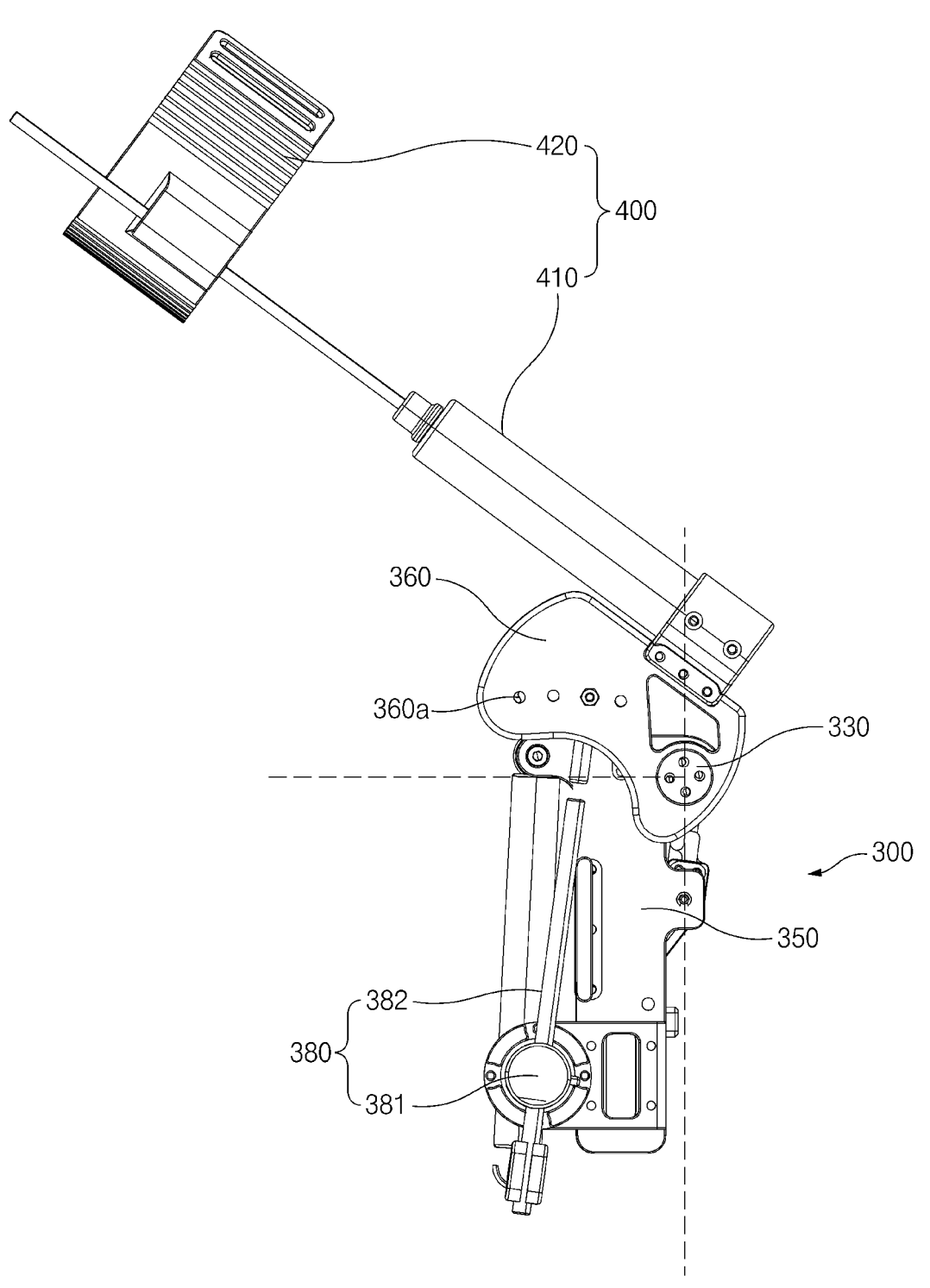
FIG. 6 is a side view illustrating a state in which the support unit of the apparatus for assisting muscular strength according to embodiments of the present disclosure is rotated upward.
Figure 7:
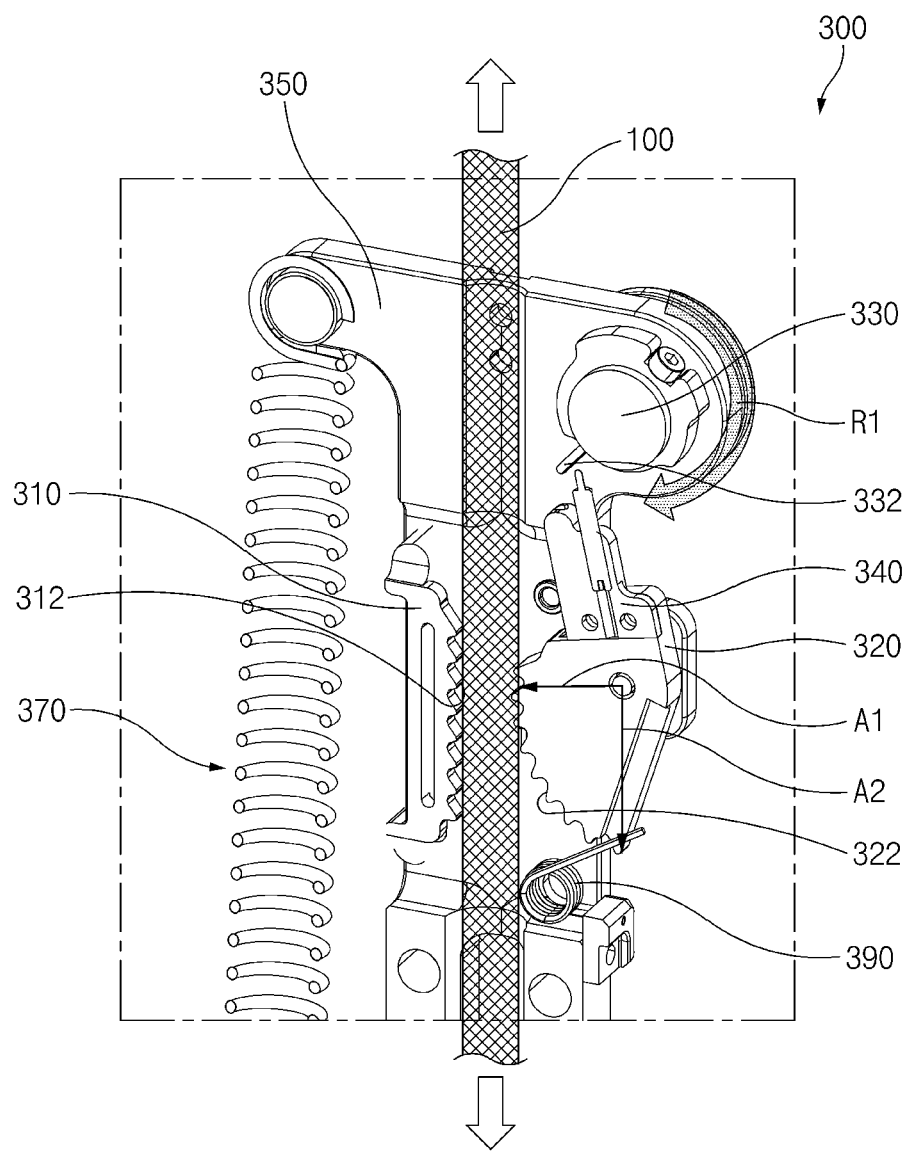
FIG. 7 is an enlarged perspective view illustrating a state in which a pawl member of the clutch unit of the apparatus for assisting muscular strength according to embodiments of the present disclosure is rotated in a first rotation direction.
Figure 8:
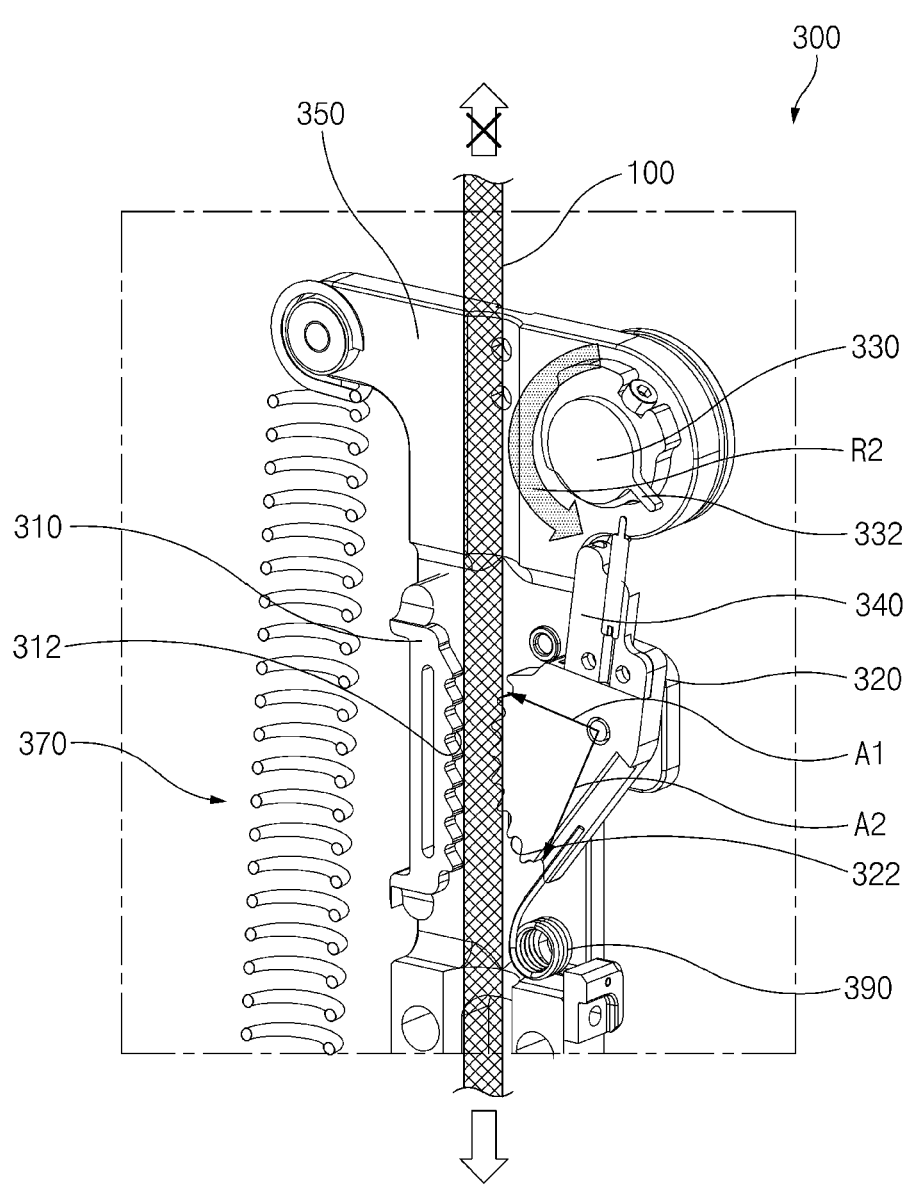
FIG. 8 is an enlarged perspective view illustrating a state in which the pawl member of the clutch unit of the apparatus for assisting muscular strength according to embodiments of the present disclosure is rotated in a second rotation direction.

In addition, FIG. 5 is a side view illustrating a state in which the support unit of the apparatus for assisting muscular strength according to embodiments of the present disclosure is rotated downward, and FIG. 6 is a side view illustrating a state in which the support unit of the apparatus for assisting muscular strength according to embodiments of the present disclosure is rotated upward. FIG. 7 is an enlarged perspective view illustrating a state in which a pawl member of the clutch unit of the apparatus for assisting muscular strength according to embodiments of the present disclosure is rotated in a first rotation direction, and FIG. 8 is an enlarged perspective view illustrating a state in which the pawl member of the clutch unit of the apparatus for assisting muscular strength according to embodiments of the present disclosure is rotated in a second rotation direction.

The apparatus 10 for assisting muscular strength according to embodiments of the present disclosure may include a wire unit 100 provided to surround the wearer's shoulders. As illustrated in FIGS. 1 and 2, when the wearer wears the apparatus 10 for assisting muscular strength, the wire unit 100 may extend upward from the wearer's rear part, surround the wearer's shoulders, and then extend to the wearer's front part. The material, thickness, and the like of the wire unit 100 may be variously changed depending on working environments of the wearer wearing the apparatus 10 for assisting muscular strength.

The apparatus 10 for assisting muscular strength may further include an elastic member 200 connected to one side of the wire unit 100 and provided to face the wearer's back. The elastic member 200 may be configured to pull the wire unit 100. More specifically, the elastic member 200 may provide predetermined tension to the wire unit boo during the working process of the wearer, thereby preventing the wire unit 100 from being loosened. For example, the elastic member 200 may be a clockwork spring.

The apparatus 10 for assisting muscular strength may further include a clutch unit 300 provided on a route through which the wire unit 100 extends. More specifically, the wire unit 100 may penetrate the clutch unit 300. As described below, the wire unit 100 and the clutch unit 300 may be configured to provide assistive power to the wearer in accordance with the working posture of the wearer. As illustrated in FIGS. 1 and 2, the clutch unit 300 may be provided to face the wearer's back.

The apparatus 10 for assisting muscular strength may further include a support unit 400 having one side rotatably coupled to the clutch unit 300 and the other side provided to support the wearer's elbow. A rotation angle of the support unit 400 with respect to the clutch unit 300 may vary depending on the working posture of the wearer. In this case, the assistive power provided to the wearer by the apparatus 10 for assisting muscular strength may vary depending on the rotation angle of the support unit 400.

Meanwhile, as described above, the wire unit 100 and the clutch unit 300 may be configured to provide assistive power to the wearer in accordance with the working posture of the wearer. More specifically, the wire unit 100 may provide the assistive power to the wearer by supporting a part of a load of the item carried by the wearer. The clutch unit 300 may provide the assistive power to the wearer by supporting the wearer's upper arm upward.

According to embodiments of the present disclosure, when the support unit 400 rotates within a first rotation range relative to the clutch unit 300, the clutch unit 300 may restrict the movement of the wire unit 100 in one of the two directions in which the wire unit 100 penetrates the clutch unit 300 in a region (hereinafter, referred to as a 'penetration region') in which the wire unit 100 penetrates the clutch unit 300. When the support unit 400 rotates within a second rotation range relative to the clutch unit 300, the clutch unit 300 may allow the movements of the wire unit 100 in the two directions in which the wire unit 100 penetrates the clutch unit 300 in the penetration region. Referring to FIG. 4, because the wire unit penetrates the clutch unit 300 in an upward/downward direction in the state in which the wearer wears the apparatus for assisting muscular strength, the above-mentioned two directions may be the upward/downward directions.

More specifically, according to embodiments of the present disclosure, the wire unit 100 may extend upward through the elastic member 200 and the clutch unit 300, surround the wearer's shoulder, and then extend to the wearer's arm via the wearer's front side. In this case, when the support unit 400 rotates within the first rotation range relative to the clutch unit 300, the clutch unit 300 may allow the downward movement of the wire unit 100 while restricting the upward movement of the wire unit 100 in the penetration region.

When the support unit 400 rotates within the first rotation range relative to the clutch unit 300, the first rotation range may mean a rotation range when the support unit 400 extends downward from the clutch unit 300, as illustrated in FIG. 5. When the support unit 400 rotates within the second rotation range relative to the clutch unit 300, the second rotation range may mean a rotation range when the support unit 400 extends upward from the clutch unit 300, as illustrated in FIG. 6. That is, FIG. 5 illustrates a state of the apparatus 10 for assisting muscular strength when the wearer wearing the apparatus 10 for assisting muscular strength works in the state in which the wearer's arm is directed downward, e.g., when the wearer carries the item. FIG. 6 illustrates a state of the apparatus 10 for assisting muscular strength when the wearer wearing the apparatus 10 for assisting muscular strength works in a state in which the wearer's arm is directed upward, e.g., when the wearer works while facing upward.

Figure 9:
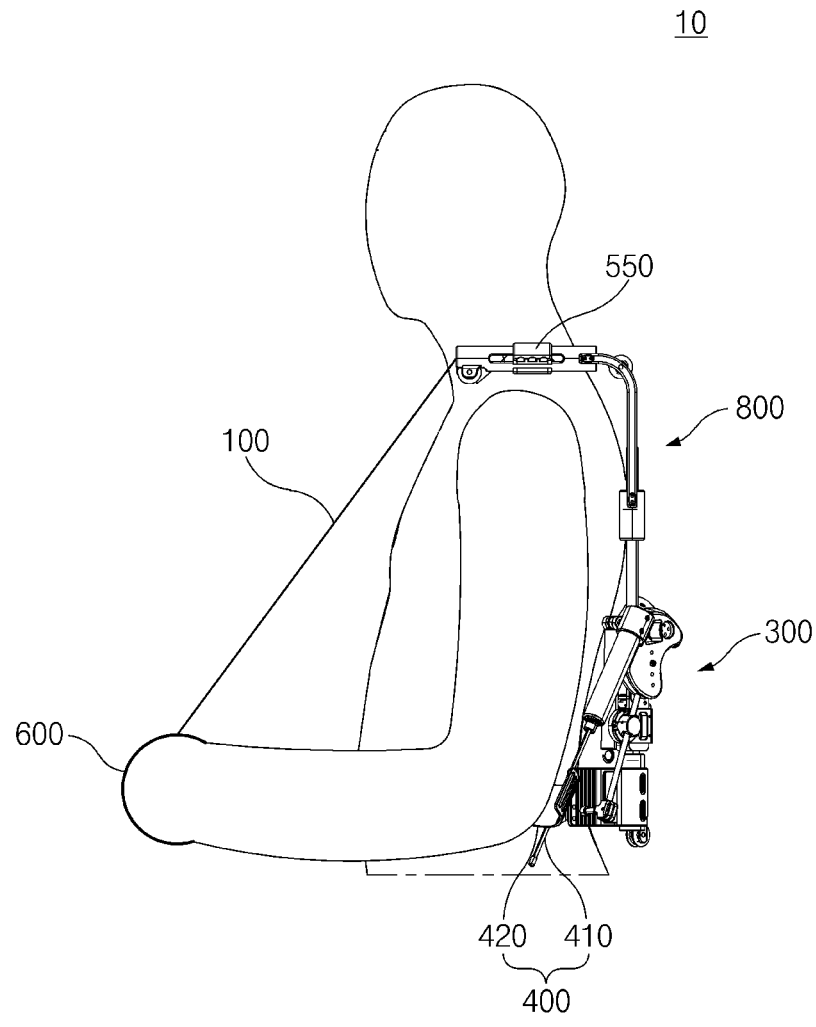
FIG. 9 is a view illustrating a state in which assistive power is provided to a lower arm of the wearer wearing the apparatus for assisting muscular strength according to embodiments of the present disclosure.

FIG. 9 is a view illustrating a state in which assistive power is provided to the lower arm of the wearer wearing the apparatus for assisting muscular strength according to embodiments of the present disclosure.

In this case, referring to the above-mentioned contents and FIGS. 1 to 5 and 9, in the apparatus 10 for assisting muscular strength according to embodiments of the present disclosure, the tension of the wire unit 100 may support a part of the load of the item when the wearer lifts the item. Therefore, it is possible to reduce the effort required for the wearer to carry the item.

That is, as described above, when the support unit 400 rotates within the first rotation range relative to the clutch unit 300, the clutch unit 300 restricts the upward movement of the wire unit 100 in the penetration region. Meanwhile, when the support unit 400 rotates within the first rotation range relative to the clutch unit 300, the wearer's arm is directed downward, as illustrated in FIG. 9. Therefore, when the upward movement of the wire unit 100 in the penetration region is restricted, an unfolding motion of the user's arm is restricted.

In this state, when the user carries the item, the tension of the wire unit 100, which is prevented from moving upward in the penetration region, is increased by the load of the item, whereas the load of the item applied to the user's lower arm is decreased. For example, even though the user does not apply a force to the lower arm at all in the state in which the user carries the item, the user's arm is not unfolded, and the tension of the wire unit 100 supports the overall load of the item. That is, according to embodiments of the present disclosure, when the wearer holds and carries the item in the state in which the wearer's arm is directed downward, the tension of the wire unit 100 supports the load of the item. Therefore, it is possible to provide assistive power to the user's lower arm. Hereinafter, a detailed configuration of the clutch unit 300 configured to restrict the movement of the wire unit 100 in order to allow the tension of the wire unit 100 to support the load of the item will be described.

Referring to FIGS. 4, 7, and 8, the clutch unit 300 may include a ratchet member 310 provided in the penetration region and having a first serrated section 312 having a serrated shape and formed in a region facing the wire unit 100, and a pawl member 320 provided to face the ratchet member 310 with the wire unit 100 interposed therebetween, the pawl member 320 having a second serrated section 322 having a serrated shape and formed in a region facing the wire unit 100. In this case, the pawl member 320 may be rotatably provided, unlike the ratchet member 310. When the wearer wears the apparatus for assisting muscular strength, the ratchet member 310 and the pawl member 320 may be spaced apart from each other in a horizontal direction.

In this case, according to embodiments of the present disclosure, when the pawl member 320 rotates by a predetermined angle toward the ratchet member 310, the ratchet member 310 and the pawl member 320 may press the wire unit 100. When the support unit 400 rotates within the first rotation range relative to the clutch unit 300, the upward movement of the wire unit 100 in the penetration region may be restricted because the first serrated section 312 of the ratchet member 310 and the second serrated section 322 of the pawl member 320 engage with each other to restrict the motion of the wire unit 100. However, the downward movement of the wire unit 100 in the penetration region may be allowed even though the ratchet member 310 and the pawl member 320 press the wire unit 100 as the pawl member 320 rotates. That is, the ratchet member 310 and the pawl member 320 according to embodiments of the present disclosure may constitute a kind of one-way clutch that allows the wire unit 100 to move only one of the two directions.

In particular, as illustrated in FIGS. 4, 7, and 8, to allow the ratchet member 310 and the pawl member 320 to operate as the one-way clutch, a distance A1 between a rotation center of the pawl member 320 and an upper end of the second serrated section 322 may be shorter than a distance between the rotation center of the pawl member 320 and a lower end of the second serrated section 322. More particularly, the distance between the second serrated section 322 and the rotation center of the pawl member 320 may increase in a direction toward a lower portion of the second serrated section 322. In this case, as illustrated in FIGS. 4, 7, and 8, when the user attempts to move the wire unit 100 upward in the state in which the ratchet member 310 and the pawl member 320 press the wire unit 100, the pawl member 320 is also attempted to be rotated upward. In this case, when the pawl member 320 is attempted to be moved upward in the state in which the distance between the second serrated section 322 and the rotation center of the pawl member 320 increases in the direction toward the lower portion of the second serrated section 322 as described above, the pawl member 320 further comes into close contact with the wire unit 100 while rotating upward, such that the pawl member 320 further strongly presses the wire unit 100. Therefore, the upward movement of the wire unit 100 is restricted.

In contrast, when the wire unit 100 is attempted to be moved downward in the state in which the ratchet member 310 and the pawl member 320 press the wire unit 100, the pawl member 320 is also attempted to be rotated downward. In this case, when the pawl member 320 is rotated downward in the state in which the distance between the second serrated section 322 and the rotation center of the pawl member 320 increases in the direction toward the lower portion of the second serrated section 322, the pawl member 320 moves away from the wire unit 100 while rotating downward, such that the downward movement of the wire unit 100 is allowed. Meanwhile, for example, the first serrated section 312 may be formed in parallel with the direction in which the wire unit 100 extends in the penetration region. The second serrated section 322 may protrude convexly toward the wire unit 100 in the penetration region.

Meanwhile, referring to FIGS. 3, 4, 7, and 8, the clutch unit 300 may further include a support unit rotation shaft 330 configured to couple the support unit 400 to the clutch unit 300 so that the support unit 400 is rotatable and a lever member 340 coupled to the pawl member 320 and protruding toward the support unit rotation shaft 330. In this case, the support unit rotation shaft 330 may be fixed relative to the support unit 400. Therefore, when the support unit 400 rotates relative to the clutch unit 300 about the support unit rotation shaft 330, the support unit rotation shaft 330 may also rotate.

In addition, the support unit rotation shaft 330 may include an interference protruding region 332 protruding toward the lever member 340 and configured to interfere with the lever member 340 in accordance with a rotational motion of the support unit rotation shaft 330. The interference protruding region 332 may press the lever member 340 in accordance with the rotation of the support unit rotation shaft 330 in conjunction with the rotation of the support unit 400, thereby rotating the pawl member 320 to which the lever member 340 is coupled. More specifically, the interference protruding region 332 may press the lever member 340 in accordance with the rotation of the support unit rotation shaft 330, thereby allowing the pawl member 320 to come into close contact with the wire unit 100 or allowing the pawl member 320 to move away from the wire unit 100.

More specifically, referring to FIG. 7, when the support unit rotation shaft 330 rotates in a first rotation direction R1, the interference protruding region 332 rotates in the first rotation direction R1 about a body of the support unit rotation shaft 330. In particular, when the support unit rotation shaft 330 rotates in the first rotation direction R1 while exceeding a predetermined rotation angle, the interference protruding region 332 presses the lever member 340 and thus rotates the pawl member 320 so that the pawl member 320 moves away from the ratchet member 310.

In contrast, referring to FIG. 8, when the support unit rotation shaft 330 rotates in a second rotation direction R2 opposite to the first rotation direction R1, the interference protruding region 332 rotates in the second rotation direction R2 about the body of the support unit rotation shaft 330. In particular, when the support unit rotation shaft 330 rotates in the second rotation direction R2 while exceeding a predetermined rotation angle, the interference protruding region 332 presses the lever member 340 and thus rotates the pawl member 320 so that the pawl member 320 moves toward the ratchet member 310.

In this case, the first rotation direction R1 may be a direction in which the support unit 400 rotates upward relative to the clutch unit 300. The second rotation direction R2 may be a direction in which the support unit 400 rotates downward relative to the clutch unit 300. Therefore, when the wearer wearing the apparatus 10 for assisting muscular strength raises his/her arm upward, the support unit 400 rotates upward, and thus the pawl member 320 moves away from the ratchet member 310. Therefore, the wire unit 100 may freely move in the upward/downward direction in the penetration region. Therefore, when the wearer works while raising his/her arm, the wearer may work without interference with the tension of the wire unit 100.

In contrast, when the wearer wearing the apparatus 10 for assisting muscular strength lowers his/her arm downward, the support unit 400 rotates downward, and thus the pawl member 320 moves toward the ratchet member 310, such that the ratchet member 310 and the pawl member 320 press the wire unit 100. Therefore, the upward movement of the wire unit 100 in the penetration region is restricted. The description of the process in which the tension of the wire unit 100 assists the wearer's lower arm when the upward movement of the wire unit 100 in the penetration region is restricted may be replaced with the above-mentioned description.

Meanwhile, the configuration in which the apparatus 10 for assisting muscular strength assists the wearer's upper arm when the wearer raises his/her arm above his/her shoulder will be described below.

Referring to FIGS. 3, 4, 7, and 8, the clutch unit 300 may include a clutch body 350 coupled to the ratchet member 310 and the pawl member 320 and penetrated by the support unit rotation shaft 330, a link member 360 coupled to be rotatable about the support unit rotation shaft 330 and fixedly coupled to the support unit 400, a support spring 370 having one side connected to the clutch body 350, and a support module 380 having one side rotatably coupled to the clutch body 350 and the other side coupled to the link member 360. The link member 360, the support spring 370, and the support module 380 may be configured to support the wearer's upper arm by pressing the support unit 400 upward. Meanwhile, the clutch body 350 does not mean only a single component. The clutch body 350 may be interpreted as meaning an overall configuration always fixed relative to the wearer regardless of an operating state of the apparatus 10 for assisting muscular strength. Meanwhile, when the support unit 400 rotates, the link member 360 may rotate together with the support unit 400 about the support unit rotation shaft 330 relative to the other components of the clutch unit 300.

Meanwhile, as illustrated in FIG. 4, the support spring 370 may extend downward from a region coupled to the clutch body 350.

Meanwhile, as described above, one side of the support spring 370 may be connected to the clutch body 350. In contrast, the other side of the support spring 370 may be connected to or spaced apart from the support module 380. This may mean that depending on the wearer's intention, two states may be selectively implemented, the two states including i) a state in which the other side of the support spring 370 is connected to the support module 380 so that the other side of the support spring 370 may operate together with the support module 380, and ii) a state in which the other side of the support spring 370 is spaced apart from the support module 380 so that the other side of the support spring 370 may operate separately from the support module 380.

More specifically, the support spring 370 may extend in the upward/downward direction in the state in which the wearer wears the apparatus 10 for assisting muscular strength. In this case, a hook region 372 may be formed at the other side of the support spring 370, e.g., a lower end of the support spring 370 based on FIG. 4. An extension region 383 extending in one direction may be formed at one side of the support module 380. In this case, the hook region 372 may engage with the extension region 383 by a hook engagement. FIG. 4 illustrates a state in which the support spring 370 is cut in the upward/downward direction in the state in which the hook region 372 engages with the extension region 383 by a hook engagement. Therefore, FIG. 4 illustrates a state in which only the extension region 383 of the support module 380 is cut. Therefore, according to embodiments of the present disclosure, the wearer may receive assistive power made by an elastic force of the support spring 370 in the state in which the hook region 372 of the support spring 370 engages with the extension region 383 by the hook engagement.

More specifically, the support module 380 may further include a module rotation shaft 381 rotatably coupled to the clutch body 350, and a rod member 382 configured to penetrate the module rotation shaft 381, fixedly coupled to the extension region 383, and having one side coupled to the link member 360. For example, the rod member 382 may extend in the upward/downward direction. However, the rod member 382 is not necessarily limited to a configuration in which an entire region thereof has a rod shape. It should be interpreted that a separate block member may be provided at a lower end of the rod member 382 connected to the extension region 383 as illustrated in FIG. 3.

In this case, as illustrated in FIG. 3, a region of the rod member 382 coupled to the link member 360 and a region of the rod member 382 coupled to the extension region 383 may face each other with the module rotation shaft 381 interposed therebetween.

Meanwhile, the link member 360 may have a plurality of holes 360a. For example, FIG. 3 illustrates that four holes 360a are formed in the link member 360. One side of the rod member 382 may be coupled to the hole 360a. More specifically, one side of the rod member 382 may be selectively coupled to one of the plurality of holes 360a. That is, according to embodiments of the present disclosure, depending on the wearer's intention, one side of the rod member 382 may be selectively coupled to one of the plurality of holes 360a. Therefore, even though the restoring force made by deformation in shape of the support spring 370 is constant, the assistive power made by the elastic force of the support spring 370 may vary depending on to which hole 360a the rod member 382 is coupled. For example, as illustrated in FIG. 3, the plurality of holes 360a formed in the link member 360 may be disposed to be spaced apart from one another in the direction away from the support unit rotation shaft 330. In this case, when the rod member 382 is coupled to the hole relatively distant from the support unit rotation shaft 330 among the plurality of holes 360a, high assistive power may be generated by the elastic force of the support spring 370 in comparison with a case in which the rod member 382 is coupled to the hole relatively close to the support unit rotation shaft 330 among the plurality of holes 360a. This can be understood that when the rod member 382 is coupled to the hole distant from the support unit rotation shaft 330 among the plurality of holes 360a, the moment arm increases, and the moment of force also increases, such that the assistive power increases.

Figure 10:
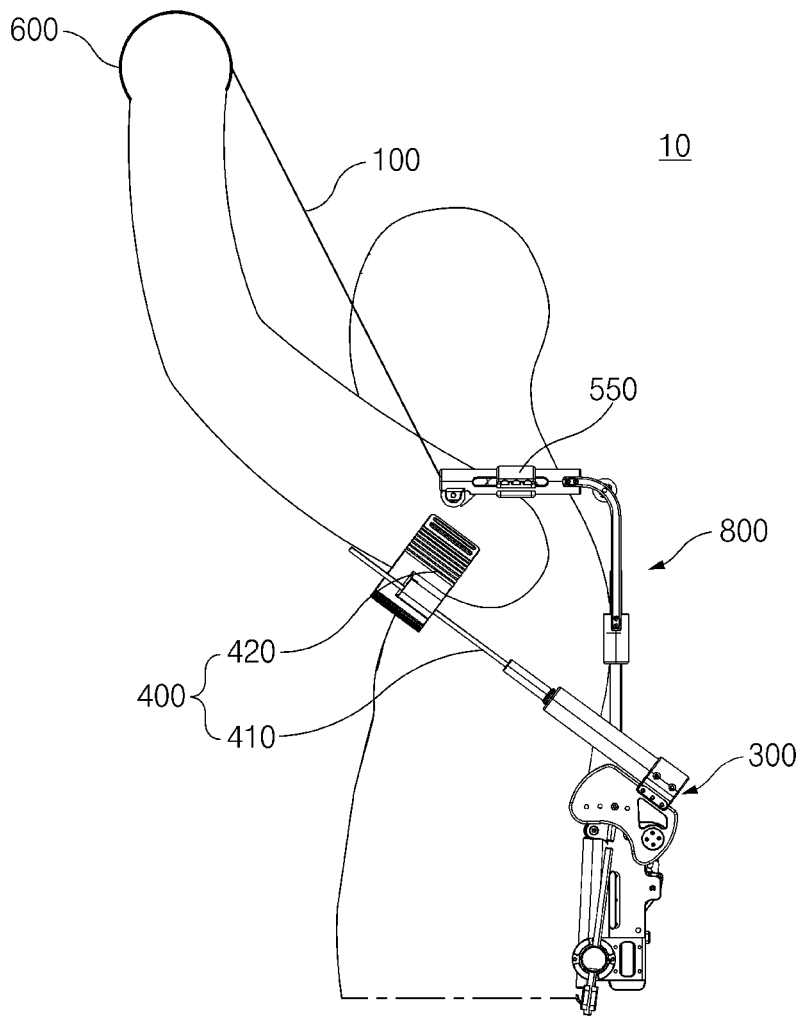
FIG. 10 is a view illustrating a state in which assistive power is provided to an upper arm of the wearer wearing the apparatus for assisting muscular strength according to embodiments of the present disclosure.
Figure 11:
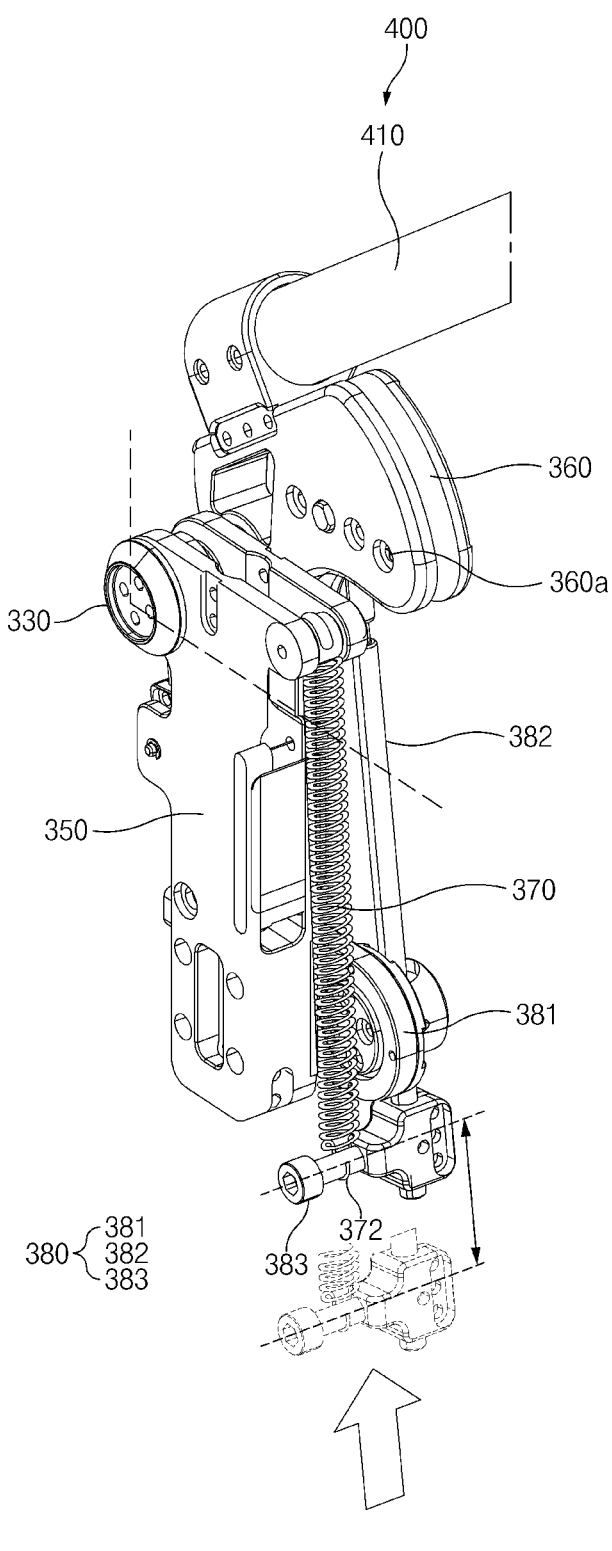
FIG. 11 is an enlarged perspective view illustrating a state in which assistive power is provided by a restoring force of a support spring of the clutch unit in the state illustrated in FIG. 9.

FIG. 10 is a view illustrating a state in which assistive power is provided to an upper arm of the wearer wearing the apparatus for assisting muscular strength according to embodiments of the present disclosure, and FIG. 11 is an enlarged perspective view illustrating a state in which assistive power is provided by a restoring force of a support spring of the clutch unit in the state illustrated in FIG. 9.

When the support unit 400 rotates downward in the state in which the hook region 372 of the support spring 370 engages with the extension region 383 of the support module 380 by the hook engagement and the upper arm is raised above the shoulder as illustrated in FIG. 10, the hook region 372 moves downward together with the extension region 383, and the support spring 370 is stretched in the state in which one side of the support spring 370 is fixed to the clutch body 350, as illustrated in FIG. 11. In FIG. 11, the hook region 372 and the extension region 383, which are indicated by solid lines, are those before the support spring 370 is stretched, and the hook region 372 and the extension region 383, which are indicated by dotted lines, are those after the support spring 370 is stretched. The support spring 370 stretched downward provides upward restoring force.

In this case, because the hook region 372 of the support spring 370 engages with the extension region 383 by the hook engagement, the upward restoring force provided by the support spring 370 is also applied to the support module 380 through the extension region 383. That is, a force is applied to the support module 380 upward based on FIG. 11. Therefore, the rod member 382 presses the link member 360 upward, and the support unit 400 fixedly coupled to the link member 360 is also pressed upward. Therefore, when the wearer works while raising his/her arm upward, the support spring 370 applies the assistive power to the upper arm. Meanwhile, the state in which the wearer raises his/her arm upward corresponds to the case in which the support unit rotation shaft 330 rotates in the first rotation direction R1 in FIG. 7. In this case, because the pawl member 320 rotates in the direction away from the ratchet member 310, the wire unit 100 may freely move in the upward/downward direction in the penetration region. Therefore, the wearer's lower arm may be freely rotated relative to the upper arm. Meanwhile, as described above, when the wearer lowers his/her arm downward and lifts an item, the tension of the wire unit 100 supports the load of the item.

Meanwhile, as illustrated in FIGS. 7 and 8, the clutch unit 300 may further include a pressing spring 390 provided at one side of the pawl member 320 and configured to press the pawl member 320 in the direction toward the ratchet member 310 when the pawl member 320 rotates in the direction away from the ratchet member 310. For example, the support unit rotation shaft 330 may be disposed above the pawl member 320, and the pressing spring 390 may be disposed below the pawl member 320.

As illustrated in FIG. 7, when the support unit rotation shaft 330 rotates in the first rotation direction R1, the pawl member 320 is moved in the direction away from the ratchet member 310 by the interference between the interference protruding region 332 and the lever member 340. In this case, the pressing spring 390 may prevent the pawl member 320 from moving away from the ratchet member 310 by a predetermined distance or more. Then, as illustrated in FIG. 8, when the support unit rotation shaft 330 rotates in the second rotation direction R2, the pawl member 320 is moved toward the ratchet member 310 by the interference between the interference protruding region 332 and the lever member 340. In this case, the pressing spring 390 compressed by the pawl member 320 presses the pawl member 320, such that the pawl member 320 may quickly move toward the ratchet member 310.

Meanwhile, as illustrated in FIG. 1, the apparatus 10 for assisting muscular strength according to embodiments of the present disclosure may further include a pulley member 500 disposed below the clutch unit 300 and configured such that the wire unit 100 surrounds an outer portion of the pulley member 500. In this case, the wire unit 100 may extend from the elastic member 200, be bent at the pulley member 500, and then pass through the clutch unit 300. That is, the pulley member 500 may be configured to change a route along which the wire unit 100 extends.

In addition, as illustrated in FIG. 1, the apparatus 10 for assisting muscular strength may further include a shoulder mounting member 550 configured to be in close contact with an upper portion of the wearer's shoulder. In this case, the wire unit 100 may extend from the wearer's back, penetrate the shoulder mounting member 550, and then extend to the wearer's front side. The shoulder mounting member 550 may be configured to prevent the wire unit 100 from coming into direct contact with the wearer's shoulder. Further, the shoulder mounting member 550 may be configured to prevent the wire unit 100 from separating from the wearer's shoulder when the wearer wears the apparatus 10 for assisting muscular strength.

Referring to FIGS. 1 and 2, the apparatus 10 for assisting muscular strength may further include a harness member 600 configured to be worn on the wearer's hand or wrist. In this case, one end of the wire unit 100 may be connected to the harness member 600. The harness member 600 may be configured to fix one end of the wire unit 100 relative to the wearer's arm so that the tension is applied to the wire unit 100 in accordance with the motion of the wearer's arm.

In addition, the apparatus 10 for assisting muscular strength may further include a waist pad 650 configured to be in close contact with a waist region of the wearer's back. For example, FIGS. 1 and 2 illustrate a state in which the waist pad 650 is disposed below the clutch unit 300.

Meanwhile, the support unit 400 may be divided into a plurality of regions. More specifically, the support unit 400 may further include a connection member 410 fixedly coupled to the link member 360 and extending in one direction, and an elbow pad 420 coupled to one side of the connection member 410 and configured to be in close contact with the wearer's elbow. More specifically, the connection member 410 may extend from the link member 360 toward the elbow pad 420.

In addition, the wire unit 100, the clutch unit 300, and the support unit 400 of the apparatus 10 for assisting muscular strength according to embodiments of the present disclosure may be disposed at each of the right and left sides of the wearer, one for each of the right and left sides, based on the elastic member 200. More particularly, the wire unit 100, the clutch unit 300, and the support unit 400 disposed at the right side of the wearer may be interchangeably identical to the wire unit 100, the clutch unit 300, and the support unit 400 disposed at the left side of the wearer.

In this case, the wire unit 100, which is disposed at the right side based on the elastic member 200 among the wire units 100, may be fixedly coupled to one side (e.g., the right side) of the elastic member 200. The wire unit 100, which is disposed at the left side based on the elastic member 200 among the wire units 100, may be fixedly coupled to the other side (e.g., the left side) of the elastic member 200.

In addition, as illustrated in FIG. 1, the apparatus 10 for assisting muscular strength may further include a waist belt member 700 configured to surround the wearer's waist and coupled to the elastic member 200, and an upper belt member 750 extending from one side of the waist belt member 700 to the shoulder mounting member 550 via the wearer's back and then extending from the shoulder mounting member 550 to the wearer's front side. For example, the waist belt member 700 may be configured to surround the wearer's waist once.

In addition, the apparatus 10 for assisting muscular strength may further include an adjustment module 800 configured to connect the clutch unit 300 and the shoulder mounting member 550. The adjustment module 800 may be configured to adjust a distance between the shoulder mounting member 550 and the clutch unit 300 in accordance with the wearer's body type.

More specifically, the adjustment module 800 may include a first adjustment member 810 fixedly coupled to the clutch unit 300 and a second adjustment member 820 fixedly coupled to the shoulder mounting member 550. In this case, the first adjustment member 810 may be penetratively coupled to the second adjustment member 820. The first adjustment member 810 may be movably coupled to the second adjustment member 820.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. An apparatus comprising:
   a wire unit configured to surround a shoulder of a wearer;
   a clutch unit penetrated by the wire unit and disposed on a route along which the wire unit extends; and
   a support unit having a first side rotatably connected to the clutch unit and a second side configured to support an elbow of the wearer,
   wherein the support unit is configured so that when the support unit rotates within a first rotation range relative to the clutch unit, the clutch unit restricts movement of the wire unit in one of two directions in which the wire unit penetrates the clutch unit in a penetration region, and
   wherein the support unit is configured so that when the support unit rotates within a second rotation range relative to the clutch unit, the clutch unit allows movement of the wire unit in the two directions in which the wire unit penetrates the clutch unit in the penetration region.

2. The apparatus of claim 1, wherein:
   the clutch unit is configured to face a back region of the wearer;
   the wire unit is configured to pass through the clutch unit, surround the shoulder of the wearer, and extend to an arm of the wearer via a front side of the wearer; and
   the support unit is configured so that when the support unit rotates within the first rotation range relative to the clutch unit, the clutch unit restricts an upward movement of the wire unit and allows a downward movement of the wire unit in the penetration region.

3. The apparatus of claim 1, further comprising:
   an elastic member connected to one side of the wire unit and configured to face a back region of the wearer; and
   a pulley member disposed below the clutch unit, wherein the wire unit is configured to surround an outer portion of the pulley member, extend from the elastic member, be bent at the pulley member, and then pass through the clutch unit.

4. The apparatus of claim 3, further comprising a shoulder mounting member configured to be in close contact with an upper portion of the shoulder of the wearer, wherein the wire unit is configured to extend from the back region of the wearer, penetrate the shoulder mounting member, and then extend to a front side of the wearer.

5. An apparatus comprising:
   a wire unit configured to surround a shoulder of a wearer;
   a clutch unit penetrated by the wire unit and disposed on a route along which the wire unit extends; and
   a support unit having a first side rotatably connected to the clutch unit and a second side configured to support an elbow of the wearer;
   wherein the support unit is configured so that when the support unit rotates within a first rotation range relative to the clutch unit, the clutch unit restricts movement of the wire unit in one of two directions in which the wire unit penetrates the clutch unit in a penetration region;
   wherein the support unit is configured so that when the support unit rotates within a second rotation range relative to the clutch unit, the clutch unit allows movement of the wire unit in the two directions in which the wire unit penetrates the clutch unit in the penetration region; and
   wherein the clutch unit comprises:
      a ratchet member disposed in the penetration region and having a first serrated section having a serrated shape and disposed in a region facing the wire unit; and
      a pawl member facing the ratchet member with the wire unit interposed therebetween, the pawl member being rotatable and having a second serrated section having a serrated shape and disposed in the region facing the wire unit, wherein when the pawl member rotates by a predetermined angle toward the ratchet member, the ratchet member and the pawl member are configured to press the wire unit.

6. The apparatus of claim 5, wherein the ratchet member and the pawl member are spaced apart from each other in a horizontal direction, and a first distance between a rotation center of the pawl member and an upper end of the second serrated section is shorter than a second distance between the rotation center of the pawl member and a lower end of the second serrated section.

7. The apparatus of claim 5, wherein the first serrated section is disposed in parallel with the directions in which the wire unit extends in the penetration region, and the second serrated section protrudes convexly toward the wire unit in the penetration region.

8. The apparatus of claim 5, wherein the clutch unit further comprises:

a support unit rotation shaft configured to couple the support unit to the clutch unit so that the support unit is rotatable; and a lever member coupled to the pawl member and protruding toward the support unit rotation shaft;

wherein the support unit rotation shaft is fixed relative to the support unit; and wherein the support unit rotation shaft comprises an interference protruding region protruding toward the lever member and configured to interfere with the lever member in accordance with a rotational motion of the support unit rotation shaft.

9. The apparatus of claim 8, wherein:

when the support unit rotation shaft rotates in a first rotation direction, the interference protruding region is configured to press the lever member and rotate the pawl member so that the pawl member moves away from the ratchet member; and when the support unit rotation shaft rotates in a second rotation direction opposite the first rotation direction, the interference protruding region is configured to press the lever member and rotate the pawl member so that the pawl member moves toward the ratchet member.

10. The apparatus of claim 9, wherein the first rotation direction is a direction in which the support unit rotates upward relative to the clutch unit, and the second rotation direction is a direction in which the support unit rotates downward relative to the clutch unit.

11. The apparatus of claim 8, wherein the clutch unit further comprises:

a clutch body coupled to the ratchet member and the pawl member and penetrated by the support unit rotation shaft;

a link member coupled to be rotatable about the support unit rotation shaft and fixedly coupled to the support unit;

a support spring having a first side connected to the clutch body; and a support module having a first side rotatably coupled to the clutch body and a second side coupled to the link member, wherein a second side of the support spring is connected to or spaced apart from the support module.

12. The apparatus of claim 11, wherein the clutch unit further comprises a pressing spring disposed at one side of the pawl member and configured to press the pawl member in a direction toward the ratchet member when the pawl member rotates in a direction away from the ratchet member.

13. The apparatus of claim 12, wherein the support unit rotation shaft is disposed above the pawl member, and the pressing spring is disposed below the pawl member.

14. The apparatus of claim 11, further comprising:

a hook region provided at the second side of the support spring; and an extension region extending in one direction provided at the first side of the support module, wherein the hook region is configured to engage with the extension region by a hook engagement.

15. The apparatus of claim 14, wherein the support spring is configured to be stretched when the support unit rotates downward in a state in which the hook region is engaged with the extension region by the hook engagement.

16. The apparatus of claim 14, wherein the support module comprises:

a module rotation shaft rotatably coupled to the clutch body; and a rod member configured to penetrate the module rotation shaft, fixedly coupled to the extension region, and having a first side coupled to the link member, wherein a region of the rod member coupled to the link member and a region of the rod member coupled to the extension region face each other with the module rotation shaft interposed therebetween.

17. The apparatus of claim 16, wherein the link member comprises a plurality of holes, and wherein the first side of the rod member is selectively coupled to one of the plurality of holes.

18. The apparatus of claim 17, wherein the plurality of holes are disposed to be spaced apart from one another in a direction away from the support unit rotation shaft.

19. An apparatus comprising:

a wire unit configured to surround a shoulder of a wearer;

a clutch unit penetrated by the wire unit and disposed on a route along which the wire unit extends; and a support unit having a first side rotatably connected to the clutch unit and a second side configured to support an elbow of the wearer;

wherein the support unit is configured so that when the support unit rotates within a first rotation range relative to the clutch unit, the clutch unit restricts movement of the wire unit in one of two directions in which the wire unit penetrates the clutch unit in a penetration region;

wherein the support unit is configured so that when the support unit rotates within a second rotation range relative to the clutch unit, the clutch unit allows movement of the wire unit in the two directions in which the wire unit penetrates the clutch unit in the penetration region; and wherein the clutch unit comprises:

a ratchet member disposed in the penetration region and having a first serrated section having a serrated shape and disposed in a region facing the wire unit; and a pawl member facing the ratchet member with the wire unit interposed therebetween, the pawl member being rotatable and having a second serrated section having a serrated shape and disposed in the region facing the wire unit, wherein when the pawl member rotates by a predetermined angle toward the ratchet member, the ratchet member and the pawl member are configured to press the wire unit, wherein the ratchet member and the pawl member are spaced apart from each other in a horizontal direction, and a distance between a rotation center of the pawl member and the second serrated section increases in a direction toward a lower portion of the second serrated section.

20. The apparatus of claim 19, wherein the first serrated section is disposed in parallel with a direction in which the wire unit extends in the penetration region, and the second serrated section protrudes convexly toward the wire unit in the penetration region.

* * * * *